(12) United States Patent
Lahtiranta et al.

(10) Patent No.: US 8,363,794 B2
(45) Date of Patent: Jan. 29, 2013

(54) VOICE MAIL EXTENSION

(75) Inventors: Atte Lahtiranta, Mountain View, CA (US); Jari P. Hamalainen, Kangasala (FI)

(73) Assignee: Nokia Corporation, Espoo (FI)

( * ) Notice: Subject to any disclaimer, the term of this patent is extended or adjusted under 35 U.S.C. 154(b) by 1175 days.

(21) Appl. No.: 11/468,182

(22) Filed: Aug. 29, 2006

(65) Prior Publication Data

US 2008/0056463 A1 Mar. 6, 2008

(51) Int. Cl.
*H04M 1/64* (2006.01)
*H04M 11/00* (2006.01)
(52) U.S. Cl. ..................... 379/88.12; 455/413
(58) Field of Classification Search .......... 370/352–356; 709/206; 379/88.01–88.23; 455/413
See application file for complete search history.

(56) References Cited

U.S. PATENT DOCUMENTS

| | | | |
|---|---|---|---|
| 6,049,796 A | 4/2000 | Siitonen et al. | |
| 6,119,146 A | 9/2000 | Heller et al. | |
| 6,141,341 A | 10/2000 | Jones et al. | |
| 6,192,258 B1 | 2/2001 | Kamada et al. | |
| 6,509,913 B2 | 1/2003 | Martin, Jr. et al. | |
| 6,965,917 B1 | 11/2005 | Aloni et al. | |
| 7,035,674 B1 | 4/2006 | Holder et al. | |
| 7,272,662 B2 | 9/2007 | Chesnais et al. | |
| 2002/0107743 A1 | 8/2002 | Sagawa | |
| 2003/0013483 A1 | 1/2003 | Ausems et al. | |
| 2003/0197740 A1 | 10/2003 | Reponen | |
| 2004/0100497 A1 | 5/2004 | Quillen et al. | |
| 2004/0107272 A1 | 6/2004 | Manukyan | |
| 2004/0205241 A1 | 10/2004 | Aarnos et al. | |
| 2004/0252679 A1 | 12/2004 | Williams et al. | |
| 2005/0076110 A1* | 4/2005 | Mathew et al. | 709/223 |
| 2005/0123118 A1 | 6/2005 | Terry et al. | |
| 2005/0141691 A1 | 6/2005 | Wengrovitz | |
| 2006/0009243 A1 | 1/2006 | Dahan et al. | |
| 2006/0080432 A1 | 4/2006 | Spataro et al. | |
| 2006/0135142 A1 | 6/2006 | Repka | |
| 2006/0168204 A1 | 7/2006 | Appelman et al. | |
| 2007/0121885 A1 | 5/2007 | Sin et al. | |
| 2007/0226360 A1 | 9/2007 | Gupta et al. | |
| 2008/0005325 A1 | 1/2008 | Wynn et al. | |
| 2008/0059627 A1 | 3/2008 | Hamalainen et al. | |

FOREIGN PATENT DOCUMENTS

| | | |
|---|---|---|
| EP | 1 043 905 A2 | 10/2000 |
| EP | 1 659 766 A1 | 5/2006 |
| JP | 2003-298721 A | 10/2003 |
| WO | 03092248 A2 | 11/2003 |
| WO | WO 2004/027559 A2 | 4/2004 |
| WO | WO 2007/008321 A2 | 1/2007 |
| WO | 2007131060 A2 | 11/2007 |

OTHER PUBLICATIONS

International Search Report dated Jun. 18, 2008.
Written Opinion dated Jun. 18, 2008.
International Search Report and Written Opinion for Application No. PCT/IB2007/002443 dated Jun. 18, 2008.

(Continued)

*Primary Examiner* — Mahammad Islam
(74) *Attorney, Agent, or Firm* — Alston & Bird LLP

(57) ABSTRACT

An apparatus including a processor, a memory connected to the processor, a user interface connected to the processor and a communication module connected to the processor. The processor is configured to automatically monitor at least one incoming message status for each of at least two voice mail accounts, and to register each of the at least one message status in the memory.

14 Claims, 7 Drawing Sheets

OTHER PUBLICATIONS

International Search Report and Written Opinion for Application No. PCT/IB2007/002441 mailed Apr. 3, 2008.
Office Action for Chinese Application No. 200780038009.X dated Dec. 31, 2011.
Preliminary Office Action for Korean Application No. 2009-7006334 dated Nov. 25, 2011.
Office Action for Russian Application No. 2009110949/08(014832) dated Jun. 11, 2010.
Office Action for Korean Application No. 2009-7006334 dated Aug. 26, 2010.
Office Action for Chinese Application No. 200780038009.X dated Oct. 13, 2010.
Preliminary Office Action for Korean Application No. 2009-7006334 dated Feb. 22, 2011.
Office Action for Chinese Application No. 200780037929.X dated Apr. 13, 2011.
Office Action for Chinese Application No. 200780037929.X dated Jun. 12, 2010.
U.S. Appl. No. 11/468,192, filed Aug. 29, 2006, In re: Lahtiranta entitled *Active Idle Extension*.
Office Action for U.S. Appl. No. 11/468,192 dated Jun. 8, 2009.
Office Action for U.S. Appl. No. 11/468,192 dated Jan. 6, 2010.
U.S. Appl. No. 11/468,189, filed Aug. 29, 2006; In re: Lahtiranta entitled *Replying Through Different Channels*.
Office Action for U.S. Appl. No. 11/468,189 dated Jun. 23, 2010.
Office Action for U.S. Appl. No. 11/468,189 dated Mar. 1, 2011.
Office Action for U.S. Appl. No. 11/468,189 dated Jun. 8, 2011.
Office Action for U.S. Appl. No. 11/468,189 dated Oct. 6, 2011.
U.S. Appl. No. 11/468,163 dated Aug. 29, 2006, In re: Hamalainen entitled *Unified Contact Database*.
Office Action for U.S. Appl. No. 11/468,163 dated May 12, 2009.
Office Action for U.S. Appl. No. 11/468,163 dated Dec. 8, 2009.
Office Action for U.S. Appl. No. 11/468,163 dated Dec. 6, 2010.
Office Action for U.S. Appl. No. 11/468,163 dated May 23, 2011.
U.S. Appl. No. 11/468,184, filed Aug. 29, 2006, In re: Lahtiranta entitled *Mobile Communication Device*.
Office Action for U.S. Appl. No. 11/468,184 dated Feb. 19, 2010.
Office Action for U.S. Appl. No. 11/468,184 dated Jul. 16, 2010.
Office Action for U.S. Appl. No. 11/468,184 dated Mar. 2, 2011.
Office Action for U.S. Appl. No. 11/468,184 dated Aug. 9, 2011.

* cited by examiner

VOICE MAIL EXTENSION

CROSS REFERENCE TO RELATED APPLICATIONS

This application is related to the following U.S. patent applications: "UNIFIED CONTACT DATABASE" U.S. application Ser. No. 11/468,163; "REPLYING THROUGH DIFFERENT CHANNELS", U.S. application Ser. No. 11/468,189; "ACTIVE IDLE EXTENSION" U.S. patent application Ser. No. 11/468,192; and "MOBILE COMMUNICATION DEVICE", U.S. application Ser. No. 11/468,184, all of which were filed on Aug. 29, 2006, the disclosures of which are incorporated herein by reference in their entirety.

BACKGROUND

1. Field

The disclosed embodiments relate to communication devices and, more specifically, to communication devices monitoring more than one voice mail account.

2. Brief Description of Related Developments

Communication devices such as mobile phones may be adapted to interface with a voice mail system, such as a system that is integrated with a mobile phone network. If a call is placed to the device but the device is not accessible, the call may be directed to a voice mail account. The caller can leave an audio message on the voice mail account, for the user of the device to retrieve at a later time. The device may be inaccessible for a variety of reasons, such as being turned off, on another call, or not in communication with a communications network. Or, the call may be directed to voicemail if the device is accessible but the user does not answer the call. The device may monitor the status of the voice mail account. For example, the device may be adapted to receive a notification of a new message at the voice mail account. The device may display an indication of the new message on a display screen. For example, the display may read "1 new message" if the device has received a notification that the voicemail account is storing a new message. To listen to the stored message, the user may press a series of keys on the device. The user may then enter a password for the account, after which the new message may be retrieved and played back on the device for the user to hear. Generally, the voice mail account is tied to the service provider associated with the device, such as for example a mobile phone.

However, some users may desire to access more than one voice mail account using the device, or voice mail accounts associated with more than one service provider. For example, if the device is a mobile phone there may be only one voice mail account for calls placed to the telephone number of the mobile phone. The user may also have, for example, a work telephone number connected to a PBX (Private Branch exchange) providing voicemail service, and/or an internet-based VoIP (Voice Over Internet Protocol) account having its own voice mail account. Traditionally, retrieving voice mail messages using a mobile phone, other than the account associated with the phone number of the phone, has separately required dialing a remote voice mail system using a traditional telephone number. For example, to access the work telephone number may require dialing the PBX system with a traditional telephone number. Additionally, when a message is received, a notification may be forwarded to the device by the service provider associated with the device. However, the user may have no way of knowing whether a new message has been received by the PBX voicemail system other than by telephoning the system to check the voice mail account. It may thus be advantageous to provide an integrated way to access multiple voice mail accounts for retrieval of messages.

SUMMARY

In one embodiment, an apparatus is provided. The apparatus includes a processor, a memory connected to the processor, a user interface connected to the processor, and a communication module connected to the processor. The processor is configured to automatically monitor at least one incoming message status for each of at least two voice mail accounts, and to register each of the at least one message status in the memory.

In another embodiment, a method is provided. The method includes activating a voice mail function of a communication device, determining if a message is present in at least two voice mail accounts associated with the communication device, where each account is associated with a different service provider and connecting a user to a voice mail account with a message.

In yet another embodiment, a computer program product is provided. The computer program product includes a computer useable medium having computer readable code means embodied therein for causing a computer to monitor a voice mail function of a communication device. The computer readable code means in the computer program product includes computer readable code means for causing a computer to activate the voice mail function of the communication device, computer readable code means for causing a computer to determine if a message is present in at least one voice mail account associated with the communication device, and computer readable code means for causing a computer to connect a user to a voice mail account with a message.

In one embodiment an apparatus is provided. The apparatus includes a means for automatically monitoring at least one incoming message status for each of at least two voice mail accounts, where each voice mail account is associated with a different service provider and a means for registering each of the at least one message status.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
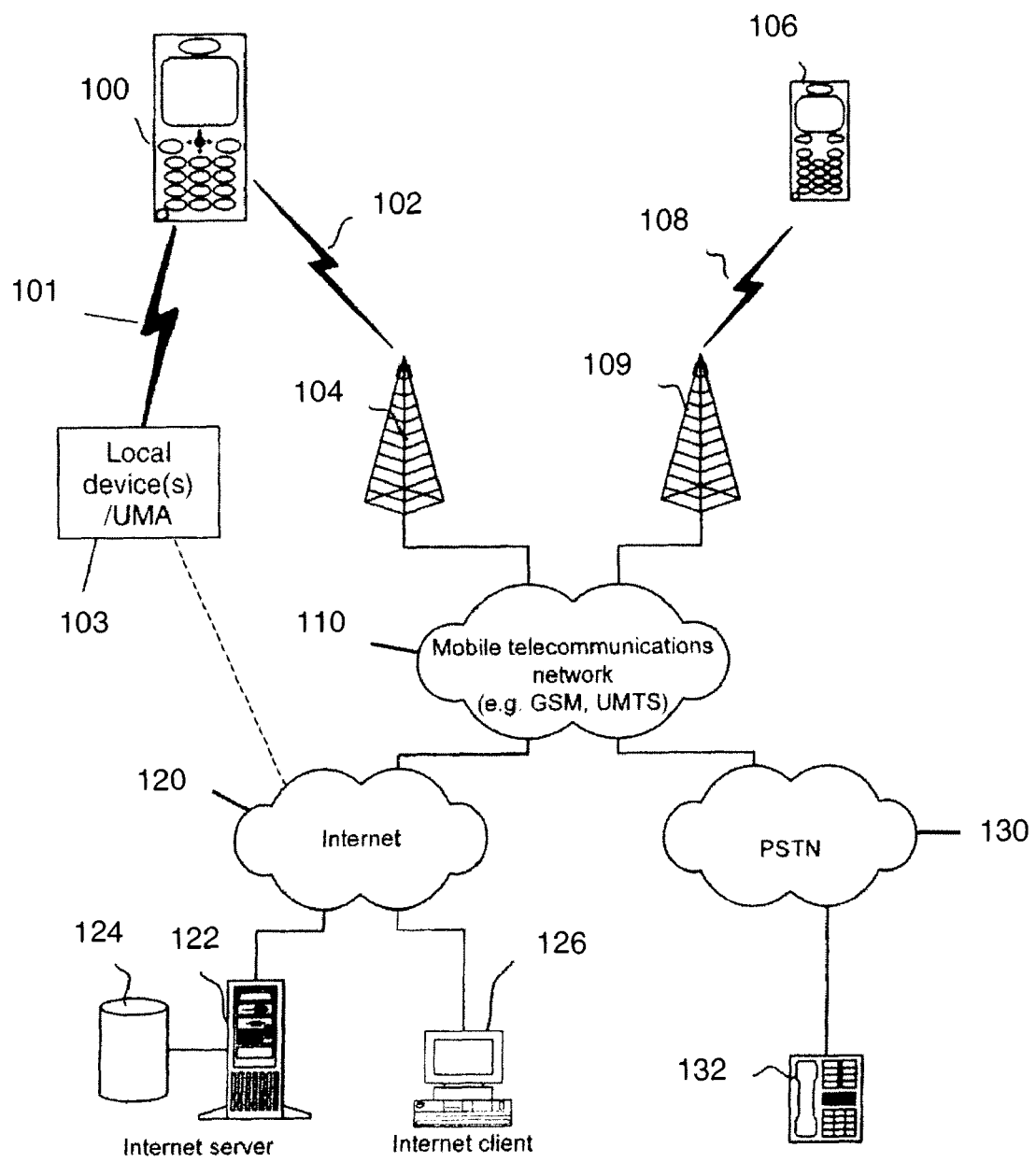
FIG. 1 shows a schematic illustration of a communication system, as an example in which aspects of the invention may be applied.

FIG. 1 illustrates a schematic illustration of a communication system, as an example, of an environment in which a communications device 600 incorporating features of an exemplary embodiment may be applied. Although aspects of the invention will be described with reference to the embodiments shown in the drawings and described below, it should be understood that these aspects could be embodied in many alternate forms of embodiments. In addition, any suitable size, shape or type of elements or materials could be used.

In the telecommunication system of FIG. 1, various telecommunications services such as cellular voice calls, www/wap browsing, cellular video calls, data calls, facsimile transmissions, music transmissions, still image transmission, video transmissions, electronic message transmissions, electronic commerce and the like may be performed between the mobile terminal 100 and other devices, such as another mobile terminal 106 or a stationary telephone 132, or an internet server 122. It is to be noted that for different embodiments of the mobile terminal 100 and in different situations, different ones of the telecommunications services referred to above may or may not be available. The aspects of the invention are not limited to any particular set of services in this respect.

The mobile terminals 100, 106 may be connected to a mobile telecommunications network 110 through radio frequency (RF) links 102, 108 via base stations 104, 109. The mobile telecommunications network 110 may be in compliance with any commercially available mobile telecommunications standard such as GSM, UMTS, D-AMPS, CDMA2000, FOMA and TD-SCDMA.

The mobile telecommunications network 110 may be operatively connected to a wide area network 120, which may be the internet or a part thereof. An internet server 122 has data storage 124 and is connected to the wide area network 120, as is an internet client computer 126. The server 122 may host a www/hap server capable of serving www/hap content to the mobile terminal 100.

For example, a public switched telephone network (PSTN) 130 may be connected to the mobile telecommunications network 110 in a familiar manner. Various telephone terminals, including the stationary telephone 132, may be connected to the PSTN 130.

The mobile terminal 100 is also capable of communicating locally via a local link 101 to one or more local devices 103. The local link 101 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 103 can, for example, be various sensors that can communicate measurement values to the mobile terminal 100 over the local link 101. The local devices 103 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 100 may thus have multi-radio capability for connecting wirelessly using mobile communications network 110, WLAN or both. Communication with the mobile telecommunications network 110 may also be implemented using WiFi, WiMax, or any other suitable protocols, and such communication may utilize unlicensed portions of the radio spectrum (e.g. unlicensed mobile access (UMA)). The above examples are not intended to be limiting, and any suitable type of link may be utilized.

Figure 2A:
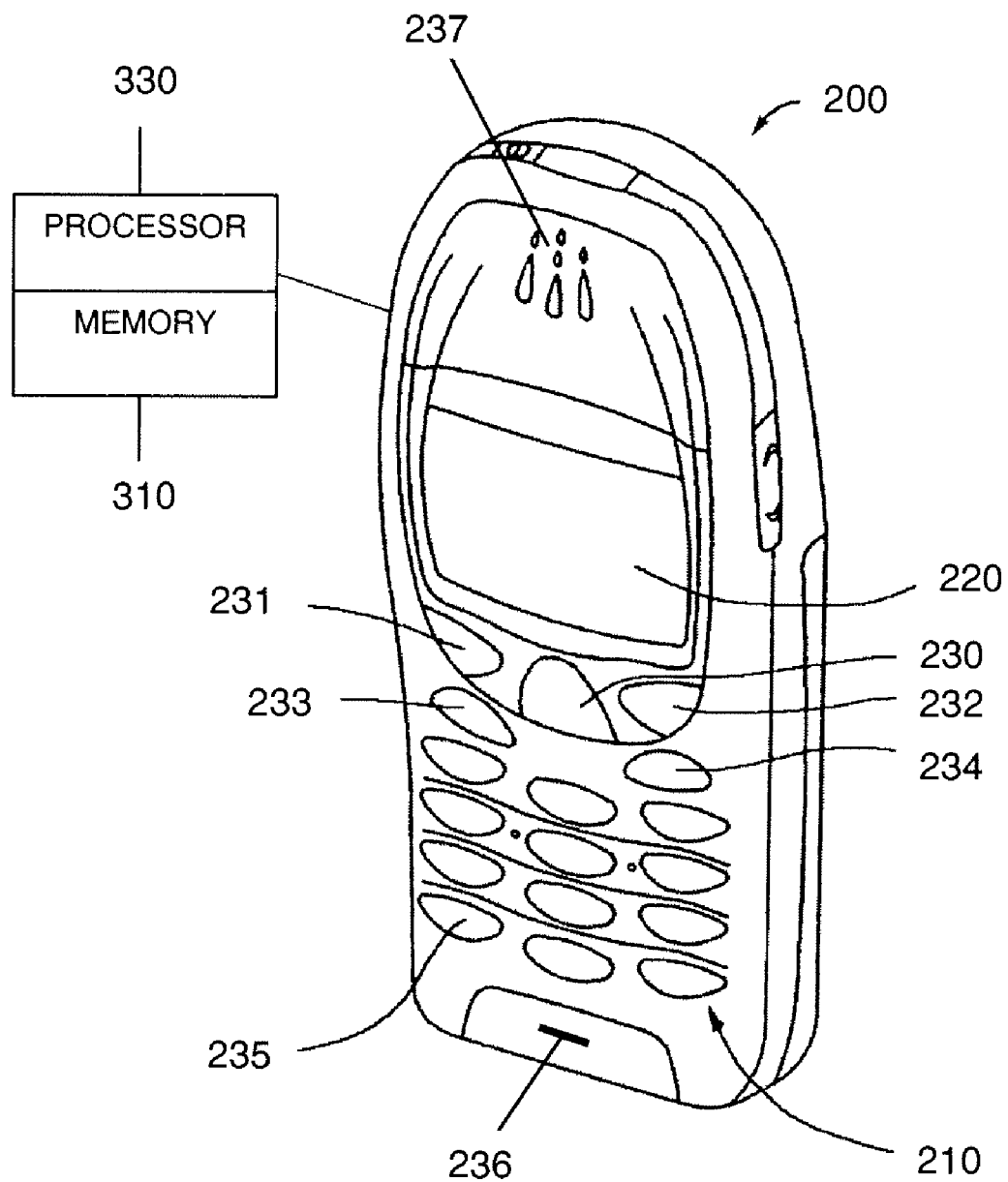
FIG. 2A shows a device incorporating features of an embodiment.

One embodiment 200 of a terminal 100 is illustrated in more detail in FIG. 2A. The mobile communications device or terminal 200 of FIG. 2A may have a keypad 210 and a display 220. The keypad 210 may include any suitable user input devices, such as for example, a multi-function/scroll key 230, soft keys 231, 232, a call key 233 and end call key 234 and alphanumeric keys 235. The display 220 may be any suitable display, such as for example, a touch screen display or a graphical user interface. The display may be integral to the device 200 or the display may be a peripheral display connected to the device 200. A pointing device, such as for example, a stylus, pen or simply the user's finger may be used with the display 220. In alternate embodiments any suitable pointing device may be used. In other alternate embodiments, the display may be a conventional display. The device 200 may further include a speaker 237 and microphone 236 for use in communications such as, for example, telephone conversations and a processor 330 and memory 310 for implementing aspects of the invention as will be described below. The device 200 may also include other suitable features such as, for example, a camera, loud speaker, or connectivity port.

Figure 2B:
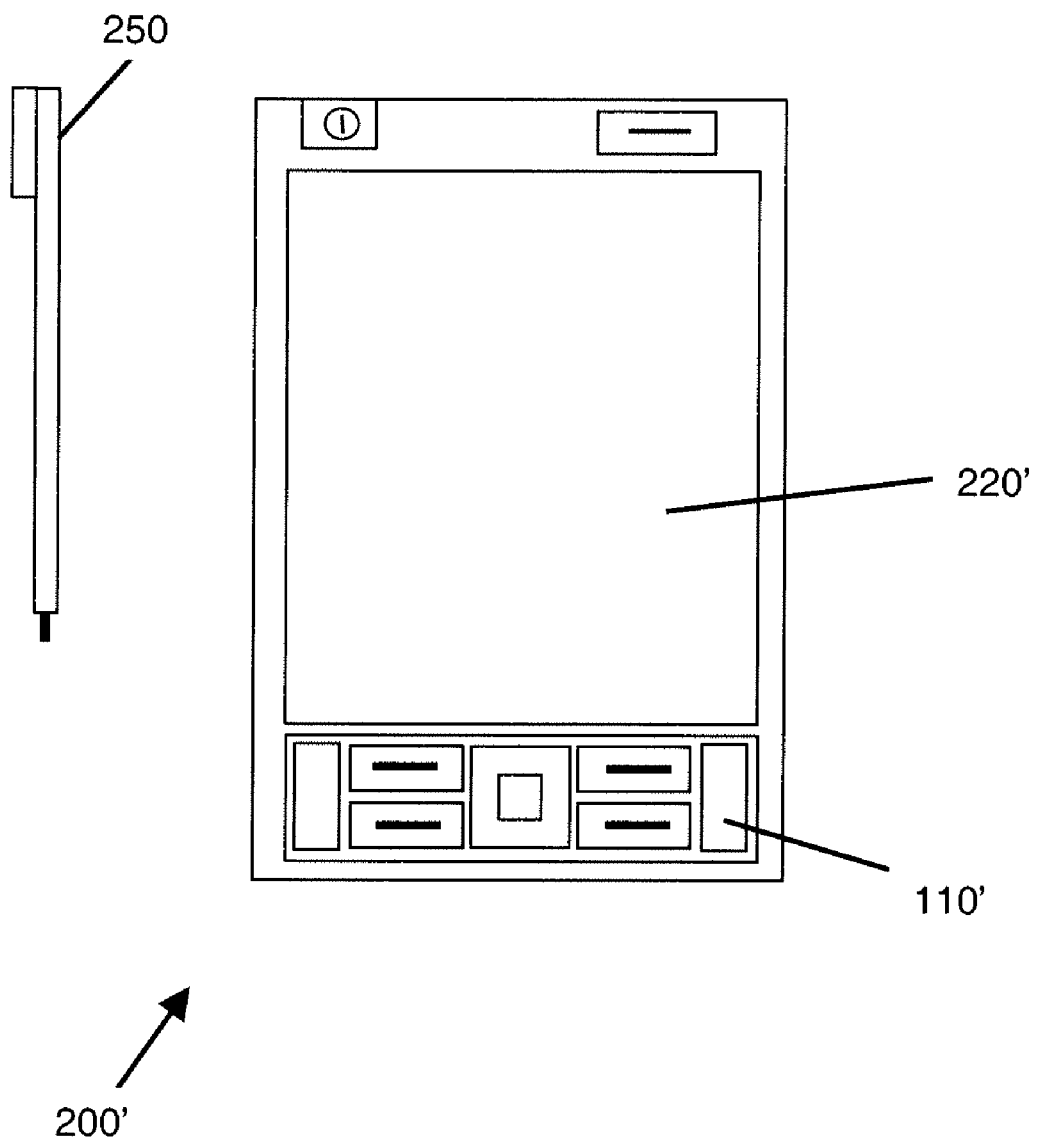
FIG. 2B shows another device incorporating features of an embodiment.

In one embodiment, the device 200, may be for example, a PDA style device 200' illustrated in FIG. 2B. The PDA 200' may have a keypad 110', a touch screen display 220' and a pointing device 250 for use on the touch screen display 220'. In still other alternate embodiments, the device may be a personal communicator, a tablet computer, a laptop or desktop computer, or any other suitable device. The exemplary embodiments herein will be described with reference to the mobile communications device 200 for exemplary purposes only and it should be understood that the embodiments could be applied equally to any suitable device.

Figure 3:
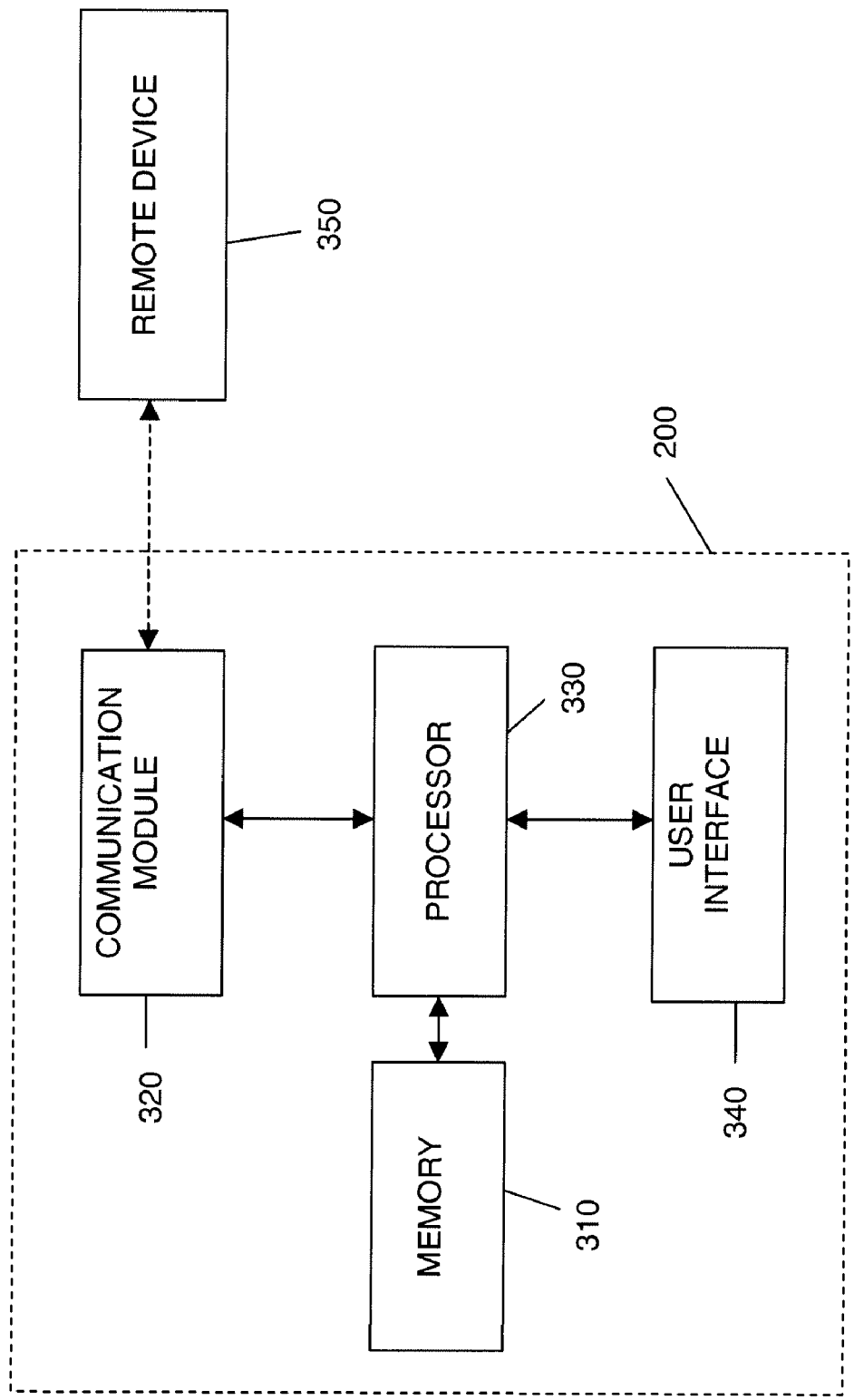
FIG. 3 is a schematic diagram illustrating aspects of the device of FIG. 1.

FIG. 3 is a block diagram illustrating various aspects of the communication device 200. The communication device 200 may have a processor 330 operable to execute programming, such as computer readable code for different device functions (e.g. email, calendar, IM, SMS, voice mail, etc). The processor may be communicably connected to a memory 310 for storing any type of suitable data (the computer readable code, the user's personal information, contact lists etc.), a user interface 340 for communicating with a user of the device 200, and a communication module 320. The user interface 340 may be substantially similar to the user interfaces described in the co-pending applications entitled "REPLYING THROUGH DIFFERENT CHANNELS", U.S. patent application Ser. No. 11/468,189 and "ACTIVE IDLE EXTENSION", U.S. patent application Ser. No. 11/468,192, the disclosures of which are incorporated herein in their entirety. The user interfaces may provide information to a user, in a single user interface, corresponding to one or more than one of the communication protocols and/or service providers. The communication module 320 may be adapted to communicate with any suitable remote device 350, such as a base transceiver, a server, a network, or any other suitable device. The communication module 320 may communicate with the remote device 350 using any suitable protocols, and may use any suitable medium, such as a wireless signal or wired link. For example, the communication module 320 may be adapted to communicate wirelessly with a remote base station using any suitable protocols (e.g. GPRS, GSM, CDMA). The communication module may be adapted to communicate using packet switched and/or circuit switched wireless communication, and may be adapted to operate simultaneously on different wireless channels.

The device 200 may be configured to provide communications over multiple channels or protocols such as, for example, VoIP (Voice Over Internet Protocol), IM (Instant Messaging), cellular phone services, SMS (Short Message Service), MMS (Multimedia Message Service), email, push-to-talk over cellular, and the like. The device may be adapted to monitor one or more voice mail account. The voice mail accounts may be each be monitored using a single channel or protocol, or multiple channels and/or protocols may be used.

Figure 4:
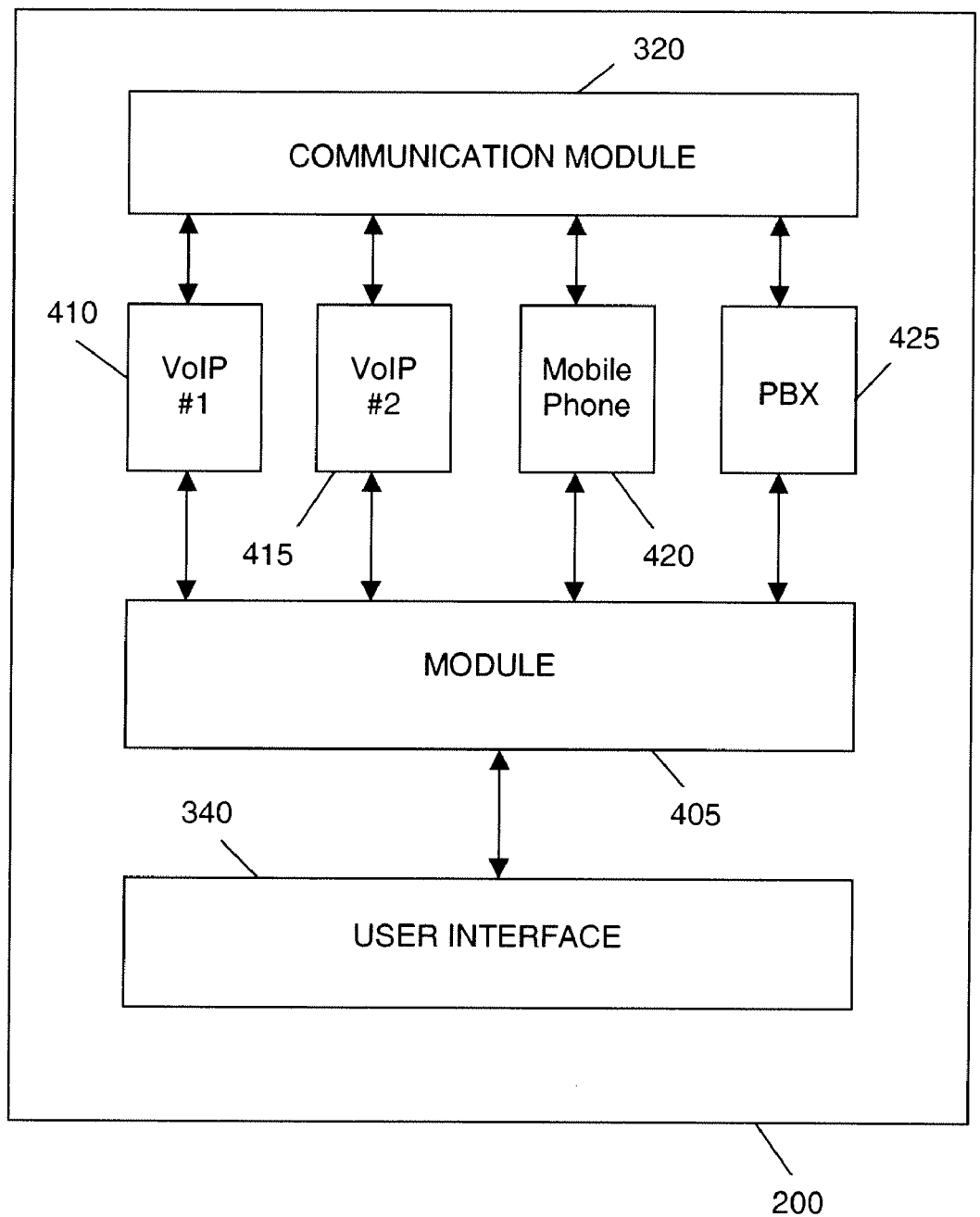
FIG. 4 is another schematic diagram illustrating aspects of the device of FIG. 1.

FIG. 4 is a schematic diagram illustrating interrelationships among various modules, components, and/or sub-devices of the device 200. FIG. 4 shows communication module 320 operably connected to several voice mail monitoring modules 410, 415, 420, 425. Each of the modules may communicate with a remote device using the communication module 320, to monitor an incoming message status for a voice mail account. The modules 410, 415, 420, 425 may be adapted to be connected to the remote devices using any suitable protocols, networks, and/or data formats. For example, module 410 may be adapted to connect, via the internet, to a VoIP-based voice mail account maintained by an internet-based VoIP service provider. Module 415 may be adapted to connect, also via the internet, to a different server for a different VoIP-based voice mail account maintained by a different service provider. Module 420 may be adapted to receive, for example, data encoded in SMS format, from a mobile service provider network, to indicate an incoming message status for the voice mail box associated with a telephone number for the device 200. Module 425 may be adapted to communicate with a remote PBX system, using any suitable protocol or network, to obtain an incoming message status for a voice mail account maintained by the PBX system. Although four voice mail monitoring modules are shown in FIG. 4, in alternate embodiments more or less than four voice mail monitoring modules may be implemented. In other alternate embodiments, the voice mail accounts of the device 200 may be monitored in any suitable manner. Each of the modules may be communicably connected to an incoming message status module 405. The incoming message status module 405 may be adapted to communicate with a user through the user interface 340, for example to identify new messages to the user or accept a user action for accessing voice mail. In other embodiments, any suitable arrangement of software and/or hardware modules may be used for the above described functions. Other embodiments may be non-modular and may be of any suitable arrangement or design.

Each of the modules 410, 415, 420, 425 may monitor an incoming message status indicating whether or not there are new messages stored in the corresponding voice mail account. An incoming message status may also indicate additional information, such as the number of new messages, the phone numbers and/or other contact information associated with the messages and the like. The processor 330 may be configured to use the information contained in the incoming message status to obtain and display a contact name of the person leaving the voice mail message. The contact name may be obtained through a phonebook such as the phonebook described in co-pending application entitled "UNIFIED CONTACT DATABASE", U.S. patent application Ser. No. 11/468,163, the disclosure of which is incorporated herein in its entirety. The phonebook may correlate a unique user name or nickname assigned to the caller by a user of the device 200 with the user names of the caller associated with different communication protocols and/or service providers. Generally, each service provider may require a unique user name or identifier in a particular format. Each of the voice mail accounts may reside on a separate system, network or server. Different protocols may be used in monitoring the various incoming message statuses. Different protocols may also be used in accessing the voice mail accounts for playback of stored messages.

In the example of FIG. 4, two of the voice mail accounts may be internet-based VoIP accounts. Each account may be maintained by a different service provider. The processor 330 may operate on a service provider client program or module 410, 415, for each of the two VoIP accounts. Each service provider client program may facilitate access to a remote system, such as a server maintained by the service provider, for monitoring an incoming message status for the voice mail account. The monitoring may be active or passive. For example, a service provider client program may be adapted to query a remote server for an incoming message status, in response to which the remote server may respond by transmitting the incoming message status. Or, the service provider client program may passively receive notifications from a remote server or other source that include an incoming message status for the account. The notifications may be automatically dispatched, for example, in response to a new message being left on the voice mail account. Any suitable communications protocol or channel may be implemented for communication between the service provider client program and the remote server or other remote device. In the exemplary embodiment, the communication may use a wireless packet switched protocol such as GPRS (General Packet Radio Service). In the exemplary embodiment, the communication may also use internet protocol (IP) to connect with a remote server on the internet, for example a server that provides, to the server provider client program, an incoming message status for the associated voice mail account. Each of the service provider client programs may be operable to interface with the user via the user interface 340, for example to facilitate user access to features of the VoIP account, display of service provider logo or other branding, and any other suitable functions.

Another voice mail account that may be monitored in the exemplary embodiment is a voice mail account associated with a telephone number for the device 200. The account may be the account that is reached in attempting to call the telephone number, for example the account to which a call is directed when the device is turned off. The account may be maintained, for example, on a mobile telephone network operated by the mobile telephone service provider for the device 200. In the exemplary embodiment, the device 200 may monitor the incoming message status using a mobile service provider voice mail module 420. The voice mail module 420 may comprise program code for passively monitoring the incoming message status. For example, the mobile telephone network may automatically send data incorporating the incoming message status. The network may send the data, for example, in response to a new message being left in the voice mail account, or may send the data at regular intervals. The incoming message status may be communicated to the voice mail routing via an SMS message over GSM (Global System for Mobile communications) or CDMA (Code Division Multiple Access), or in any other suitable format using and suitable protocol. In alternate embodiments, the incoming message status may be monitored in any suitable manner, such as active monitoring. For example, the network may notify the device 200 of an incoming message status in response to a query from the device. In other embodiments, any suitable channel, protocol, or messaging format may be used to send the incoming message status to the device 200.

Another voice mail account for which an incoming message status may be monitored in the exemplary embodiment is a PBX voice mail account. The voice mail account may reside on a PBX system that is remote from the device. The device may be provided with a PBX provider client program or module 425 for accessing the voice mail account and for communicating an incoming message status for the account to the device 200. The PBX provider client program may actively or passively monitor the incoming message status.

For example, the PBX provider client program may be operable to query the remote PBX system, causing the remote PBX system to send the incoming message status to the PBX provider client program. Or, the remote PBX system may automatically send data indicating the incoming message to the PBX provider client program, in response to a new message being left in the account. Any other suitable arrangement may be used. The PBX provider client program may communicate with the remote PBX system using any suitable protocol or channel. For example, the communication may involve data exchange over the internet, use of SMS messages, or any other suitable network, data format, or communications protocol.

In the exemplary embodiment, each of the service provider client programs 410, 415, the mobile service provider voice mail module 420, and the PBX provider client program 425 may be considered as voice mail interface modules. Each voice mail interface module may be operable to exchange data with an incoming message module 405, as shown in FIG. 4. When a voice mail interface module 410, 415, 420, 425 receives an update to a monitored incoming message status, the voice mail interface module 410, 415, 420, 425 may communicate the updated incoming message status to the module 405. Thus, each of the four incoming message statuses may be registered in the module 405. Each incoming message status may include information as to whether or not there is a new (i.e. not yet retrieved or listened to) message on the voice mail account. In alternate embodiments, any suitable information may be included in the incoming message status. For example, one or more of the incoming message statuses may include additional information, such as the number of new messages in the account, number of saved messages, identity of the caller leaving a message, identity of the source of the call (e.g. the telephone number, VoIP account identifier, etc.) or any other suitable information.

The incoming message module 405 may be operable to communicate the existence of one or more new voice mail messages to a user, through the user interface 340. For example, the user interface 340 may display, on the display screen 220, a graphical icon or text statement indicating the existence of a new message. The module 405 may also inform the user, via the user interface, of the total number of new messages, which of the monitored accounts has a new message, the identity of the caller(s) or any other suitable information. For example, the visual indication of a new message may be displayed whenever the module 405 receives an update to an incoming message status indicating that an additional new message has been left in one of the voice mail accounts. In other embodiments, the user interface 340 may comprise an audio interface, with the user audibly informed of new messages, or the user interface 340 may comprise any other suitable device such as a peripheral device connected to the device 200. In still other embodiments, the user may not be automatically notified of new messages.

The module 405 may be adapted to respond to an action of the user, received by the user interface, to access voice mail. The action of the user may be, for example, a key-press on a keypad, an audible statement of the user identified using the microphone 236, or the action may be any other suitable action. The response of the processor 330 may differ depending upon the incoming message statuses. More specifically, the response may differ depending upon the number of monitored accounts for which the incoming message status indicates one or more new messages. For example, if only one of the monitored accounts has an associated monitored incoming message status indicating a new message, device 200 may directly respond to the action of the user by accessing that one voice mail account, without requiring further action on the part of the user. Accessing the account may include retrieving one or more new messages for playback of the message through the speaker. The user may be requested to enter an access code prior to retrieval of the message, or the message may be retrieved automatically. For example, the device may be programmed with access codes for retrieving a message from the account without requiring the user to enter an access code, or the account may not require an access code for retrieval of messages.

Figure 5:
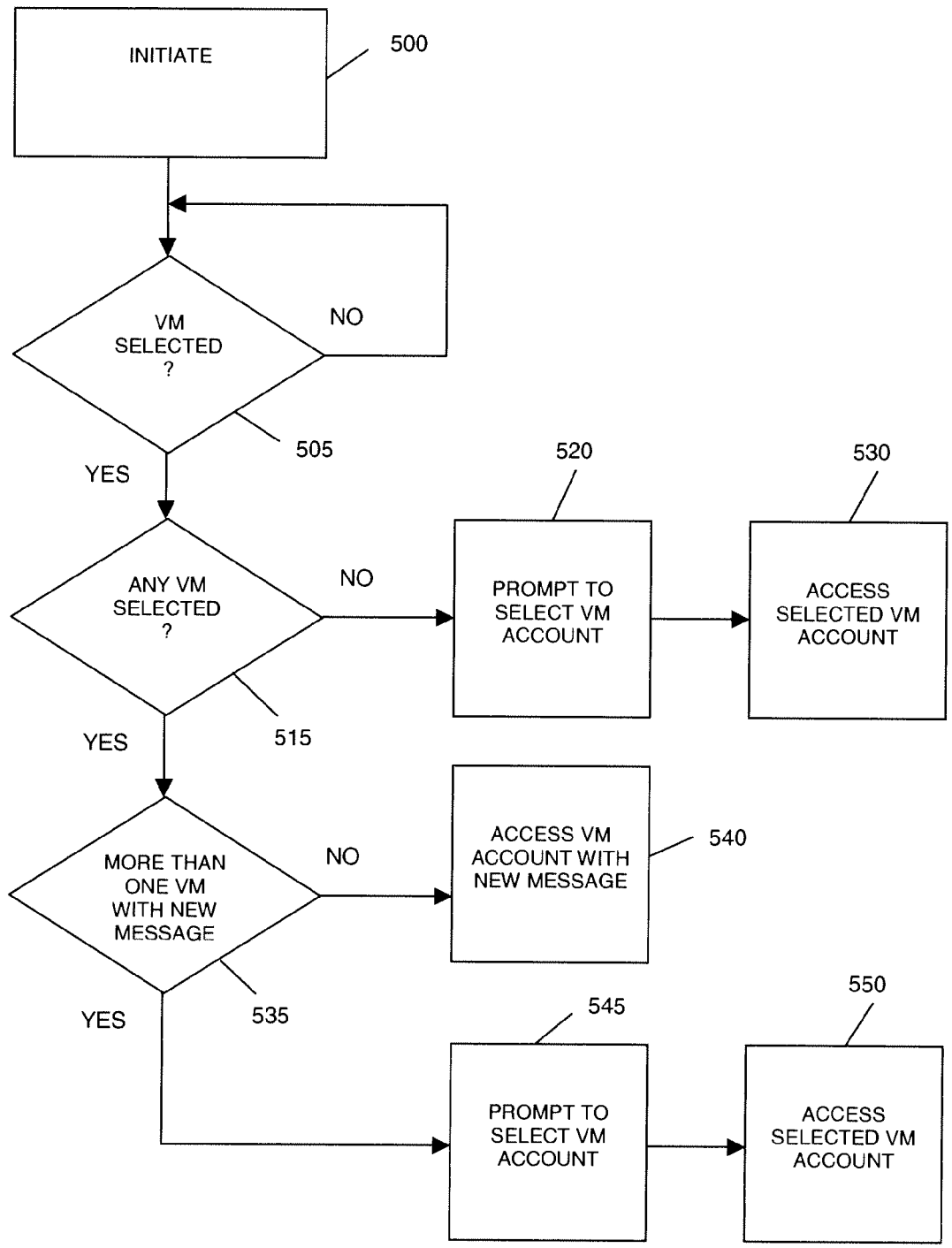
FIG. 5 is a flow chart illustrating aspects of the device of FIG. 1.

FIG. 5 illustrates an exemplary flow diagram of a method that may be implemented by the processor 330 for monitoring the incoming message status via the module 340 and retrieving messages. Initiation of the monitoring may occur in block 500, for example in response to powering the device 200. In block 505, the processor 330 may determine whether or not the user is performing an action, for example pressing a predefined key, that indicates an intention of the user to access a voice mail function of the device. If no such action is identified, block 505 may continue to execute. If the user is performing an action, such as pressing the key, that indicates an intention to access a voice mail function, the processor 330 may determine whether any of the monitored incoming message statuses for the voice mail accounts indicate a new voice mail in block 515. If there are no indications of new voice mail, the processor may, in block 520, prompt the user for selection of one of the monitored voice mail accounts to access for retrieval of one or more messages. The processor 330 may automatically connect the user to a corresponding service provider to access the selected voice mail account in step 530 in response to the user selection. If, in block 515, the processor 330 determines that one or more of the incoming message statuses indicates a new voice mail, the processor 330 may determine, in block 535, whether more than one monitored incoming message status indicates one or more new messages in the corresponding account. If there is only one monitored incoming message status indicating one or more new messages, the processor 330 may automatically access that voice mail account in block 540 by automatically connecting the user to the corresponding service provider when the voice mail function is accessed. If there is more than one incoming message status indicating a new message in a corresponding account, the processor 330 may, in block 545, prompt the user to select from among only those voice mail accounts with incoming message statuses indicating one or more new message. These voice mail accounts may be presented to the user via lists. Where for example, two or more service providers have an incoming message, the messages may be presented to the user in an order from the newest message to the oldest message, where all the service providers are included in a single messages list. An indication of the service provider may be displayed next to the message in the list of messages. In alternate embodiments, a list of incoming messages may be provided for each service provider where each list of messages is listed from the newest message to the oldest message. In other alternate embodiments, the messages may be presented to the user in any suitable manner. In block 550, the processor 330 may automatically connect the user to a service provider for the selected account in response to the user selection so that the corresponding messages may be accessed. The flow diagram of FIG. 5 is merely exemplary and in alternate embodiments any suitable structure, routines, methods, or devices may be implemented.

As described above, the response of the processor 330 to the action of the user may be different when more than one of the monitored voice mail accounts has a corresponding incoming message status indicating a new message. In such a case, the processor 330 may cause to be displayed, on the display screen 220, a list of voice mail accounts. The list may be a prompt for user selection of one of the accounts. In the exemplary embodiment, only accounts having an incoming message status showing one or more new messages may be shown on the list and made selectable by the user in block 545. In other embodiments, all of the monitored voice mail accounts may be shown, or all accounts holding messages (new, saved, or otherwise) may be shown and selectable while other monitored accounts are not shown. In other embodiments, the selectable accounts may be identified to the user in an audible form via the speaker 237, or may be otherwise identified in any suitable manner using any suitable device. In the exemplary embodiment, the user may select from among the list of selectable accounts by making one or more key-presses. In other embodiments, the device may accept a user selection through the user speaking into the microphone 236 or through any other suitable device or communication form. The user-selected account may then be accessed by the device. Accessing the account may include retrieving one or more new messages for playback of the message through, for example, the speaker 237. As noted above, the user may be requested to enter an access code prior to retrieval of the message, or the message may be retrieved automatically. For example, the device may be programmed with access codes for retrieving a message from the account, or the account may not require an access code for retrieval of messages.

The processor 330, via module 405, may produce another response to the action of the user when none of the monitored voice mail accounts has an incoming message status indicating one or more new messages. When none of the voice mail accounts has an incoming message status indicating one or more new messages, the module 405 may cause to be displayed, on the display screen 220, a list of all of the monitored voice mail accounts. The user may select from among the list of selectable accounts by making one or more key-presses. The processor 330 may access the selected voice mail account, for example to retrieve saved (previously heard) messages, to change administrative features related to the account, of for any other suitable activity. In other embodiments, the selectable accounts may be identified to the user in an audible form, or may be otherwise identified in any suitable manner using any suitable device. In other embodiments, the account to be accessed may be selected by speaking into the microphone 236 or in any other suitable way.

In alternate embodiments of the invention the monitoring of the several incoming message account statuses, as well as the functions of the incoming status module 405, may be performed externally from the communications device. For example, a mobile telephone service provider may maintain suitable devices, remote from the communications device, that are programmed to monitor the multiple incoming message statuses. The communication device may be programmed to transmit to the remote device a request for voice-mail access in response to the user's action requesting voice mail. The remote device may respond to the request differently depending upon the monitored incoming message statuses. For example, the remote device may automatically access an account having new messages in a case where only one of the monitored voicemail accounts has a monitored incoming message status indicating a new message. In the case where more than one voice mail account has a monitored incoming message status indicating a new message, the remote device may identify, to the communications device, which of the accounts has new messages. The communications device may then prompt the user for selection of an account to access from among the accounts having new messages. If none of the accounts have an incoming message status indicating a new message, the remote device may notify the communications device that there are no new messages, and the communications device may prompt the user for user selection of one of the accounts, for accessing of the selected account.

Figure 6:
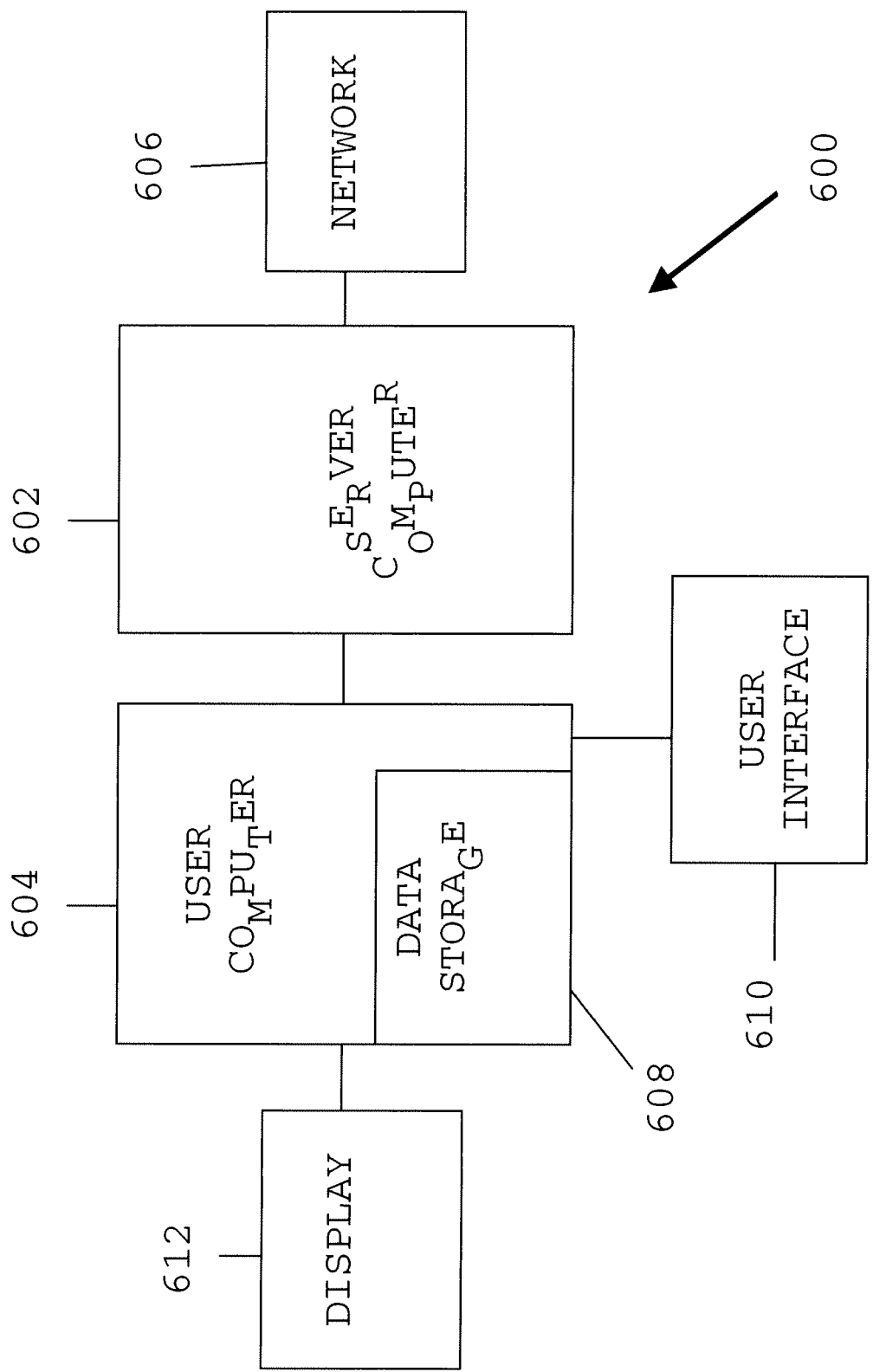
FIG. 6 is a block diagram of another embodiment.

The disclosed embodiments may also include software and computer programs incorporating the process steps and instructions described above that are executed in different computers. FIG. 6 is a block diagram of one embodiment of a typical apparatus 600 incorporating features that may be used to practice the present invention. As shown, a computer system 602 may be linked to another computer system 604, such that the computers 602 and 604 are capable of sending information to each other and receiving information from each other. In one embodiment, computer system 602 could include a server computer adapted to communicate with a network 606. Computer systems 602 and 604 can be linked together in any conventional manner including, for example, a modem, hard wire connection, or fiber optic link. Generally, information can be made available to both computer systems 602 and 604 using a communication protocol typically sent over a communication channel or through a dial-up connection on ISDN line. Computers 602 and 604 are generally adapted to utilize program storage devices embodying machine readable program source code which is adapted to cause the computers 602 and 604 to perform the method steps of the present invention. The program storage devices incorporating features of the invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semi-conductor materials and chips.

Computer systems 602 and 604 may also include a microprocessor for executing stored programs. Computer 602 may include a data storage device 608 on its program storage device for the storage of information and data. The computer program or software incorporating the processes and method steps incorporating features of the present invention may be stored in one or more computers 602 and 604 on an otherwise conventional program storage device. In one embodiment, computers 602 and 604 may include a user interface 610, and a display interface 612 from which features of the present invention can be accessed. The user interface 610 and the display interface 612 can be adapted to allow the input of queries and commands to the system, as well as present the results of the commands and queries.

It should be understood that the foregoing description is only illustrative of the invention. Various alternatives and modifications can be devised by those skilled in the art without departing from the invention. Accordingly, the disclosed embodiments are intended to embrace all such alternatives, modifications and variances which fall within the scope of the appended claims.

What is claimed is:
1. An apparatus comprising:
 a processor; and
 a memory including computer program code;
 the memory and computer program code configured to, with the processor, cause the apparatus to:
  operate as a telecommunications network terminal;

automatically monitor at least one incoming message status for each of at least two voicemail accounts associated with different voicemail service providers, and to register each of the at least one message status in the memory;

cause display of the at least two voicemail accounts;

receive an indication to access a message from one of the at least two voicemail accounts;

in response to receiving the indication, automatically connect to the service provider associated with the voicemail account with which the message to be accessed; and access the voicemail account associated with the message for retrieval of at least one message, wherein accessing the voicemail account is without requiring a user to enter an access code.

2. The apparatus of claim 1, wherein the at least one memory and the computer program code are further configured to, with the processor, cause the apparatus to:

respond to at least one user request, wherein the response of the processor depends upon a content of the monitored incoming message statuses.

3. The apparatus of claim 2, wherein the at least one memory and the computer program code are further configured to, with the processor, cause the apparatus to:

access a corresponding account for retrieval of at least one new message when the at least one monitored incoming message status indicates at least one new message in the corresponding account.

4. The apparatus of claim 2, wherein the at least one memory and the computer program code are further configured to, with the processor, cause the apparatus to:

receive a selection of a voice mail account when at least two of the at least one monitored incoming message status indicates at least one new message for a corresponding voice mail account.

5. The apparatus of claim 1, wherein the at least one memory and the computer program code are further configured to, with the processor, cause the apparatus to:

present lists of messages corresponding to the voice mail accounts where the messages are presented in an order from newest to oldest.

6. The apparatus of claim 1 wherein the at least one memory and the computer program code are further configured to, with the processor, cause the apparatus to:

receive a selection of a voice mail account when none of the at least one monitored incoming message status indicates a new message.

7. The apparatus of claim 2, wherein the at least one memory and the computer program code are further configured to, with the processor, cause the apparatus to:

display, a list of voicemail accounts having a corresponding monitored incoming message status indicating at least one new message.

8. The apparatus of claim 1, wherein at least one of the at least two monitored voice mail accounts uses a different protocol.

9. The apparatus of claim 1, wherein the apparatus is a mobile telephone.

10. A method comprising:

activating a voice mail function of a telecommunications network terminal; and using the telecommunications network terminal to:

automatically monitor at least one incoming message status for each of at least two voicemail accounts;

determine if a message is present in the at least two voice mail accounts associated with the telecommunications network terminal, where each account is associated with a different voicemail service provider;

cause display of the at least two voicemail accounts;

receive an indication to access a message from one of the at least two voicemail accounts;

in response to receiving the indication, automatically connect to the service provider associated with the voicemail account with which the message to be accessed; and access the voicemail account associated with the message for retrieval of at least one message, wherein accessing the voicemail account is without requiring a user to enter an access code.

11. The method of claim 10, further comprising notifying a user of the telecommunications network terminal of a presence of one or more voice mails without a need to activate the voice mail function.

12. A computer program product comprising:

a non-transitory computer useable medium having computer readable code embodied therein for causing a computer to monitor a voice mail function of a telecommunications network terminal, the computer readable code in the computer program product comprising:

monitor a voicemail function;

activate the voicemail function;

actively and automatically monitor at least one incoming message status for each of at least two voicemail accounts associated with different voicemail service providers;

determine if a message is present in at least one of the voice mail accounts;

cause display of the at least two voicemail accounts;

receive an indication to access a message from one of the at least two voice mail accounts;

in response to receiving the indication, automatically connect to the service provider associated with the voicemail account with which the message to be accessed; and access the voicemail account associated with the message for retrieval of at least one message, wherein accessing the voicemail account is without requiring a user to enter an access code.

13. A computer program product according to claim 12 wherein the computer-executable program code instructions comprise program code instructions to:

provide notification of the presence of one or more voice mails without a need to activate the voice mail function.

14. A computer program product according to claim 12 wherein the computer-executable program code instructions comprise program code instructions to:

automatically switch an active service provider to a service provider associated with a received voice mail message, when the active service provider is different from the service provider associated with the voicemail account with a message.

* * * * *

UNITED STATES PATENT AND TRADEMARK OFFICE
CERTIFICATE OF CORRECTION

Page 1 of 1

PATENT NO. : 8,363,794 B2
APPLICATION NO. : 11/468182
DATED : January 29, 2013
INVENTOR(S) : Atte Lahtiranta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1347 days.

Signed and Sealed this
Eighteenth Day of November, 2014

Michelle K. Lee
*Deputy Director of the United States Patent and Trademark Office*